(No Model.)
D. G. BOLTON.
ICE VELOCIPEDE.
No. 526,556. Patented Sept. 25, 1894.
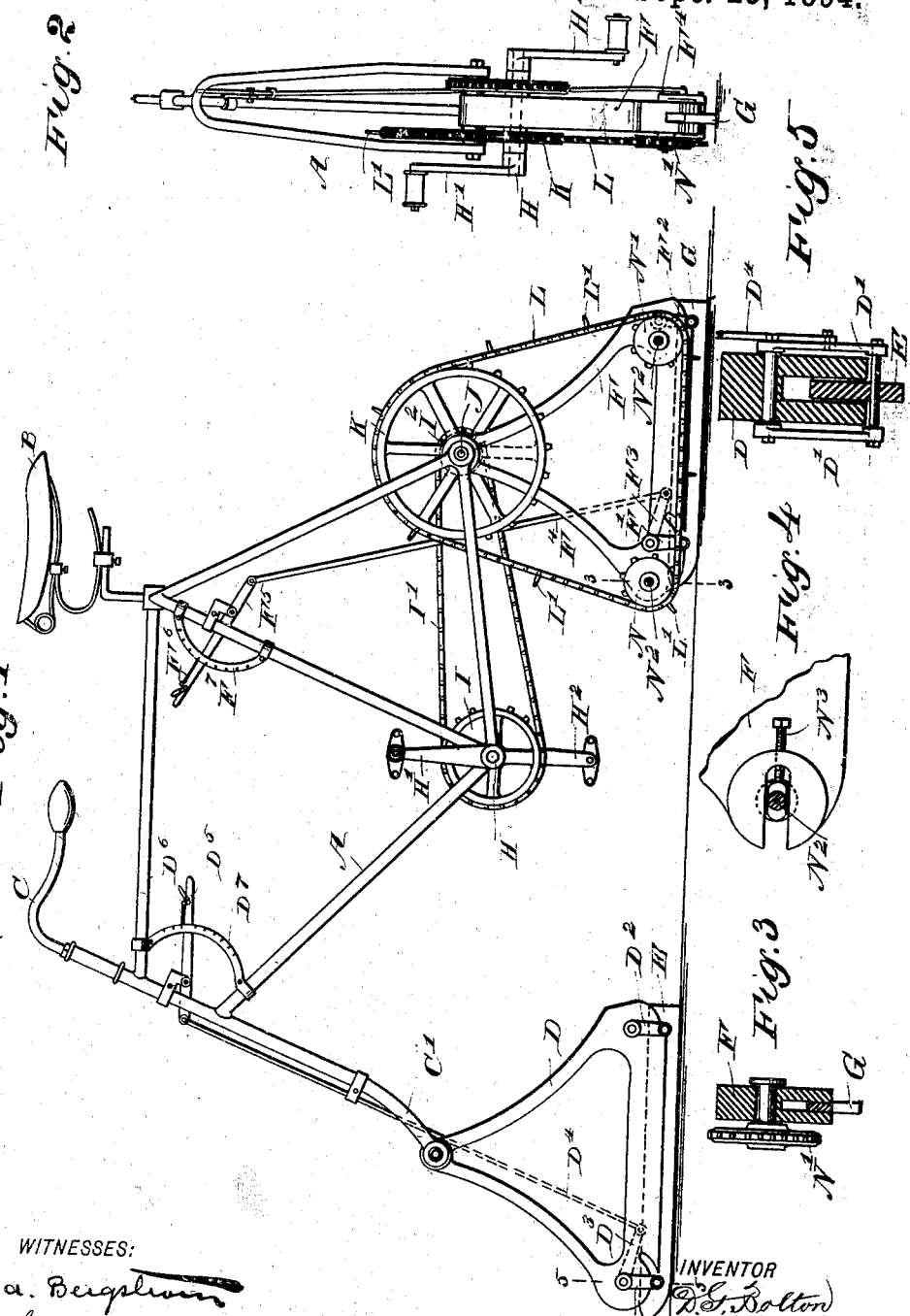
WITNESSES:
J. A. Bergstrom
C. Sedgwick
INVENTOR
D. G. Bolton
BY
Munn & Co
ATTORNEYS.

UNITED STATES PATENT OFFICE.

DAN GREGORY BOLTON, OF COOPERSTOWN, NEW YORK.

ICE-VELOCIPEDE.

SPECIFICATION forming part of Letters Patent No. 526,556, dated September 25, 1894.

Application filed November 22, 1893. Serial No. 491,639. (No model.)

*To all whom it may concern:*

Be it known that I, DAN GREGORY BOLTON, of Cooperstown, in the county of Otsego and State of New York, have invented a new and Improved Snow and Ice Velocipede, of which the following is a full, clear, and exact description.

The object of the invention is to provide a new and improved snow and ice velocipede, which is simple and durable in construction, and arranged to enable the rider to travel over the snow and ice at a high rate of speed.

The invention consists principally of single front and rear runners supporting the frame, and connected thereto by horizontal pivots and a propelling chain mounted to travel along the rear runner and driven from the crank or pedal shaft through the medium of a sprocket wheel mounted on the pivot connecting the said runner with the frame.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a rear end view of the same. Fig. 3 is an enlarged cross section of part of the rear runner and adjacent mechanism. Fig. 4 is an enlarged sectional side elevation of the adjusting mechanism for the propelling chain; and Fig. 5 is an enlarged cross section of the front runner on the line 5—5 of Fig. 1.

The improved snow and ice velocipede is provided with a main frame A, carrying the usual seat B, and provided with the steering handle C, having its lower forked end C' pivotally connected with an auxiliary frame D, carrying the front runner E. A second auxiliary frame F, is jointed to the rear end of the main frame A, and this auxiliary frame carries the rear runner G, which latter like the front runner E is single, and both are normally in alignment one with the other.

In the main frame A, is journaled the usual pedal or crank shaft H, carrying at its ends the pedals H' and H² operated by the feet of the rider seated on the seat B. On the crank or pedal shaft H, is secured a sprocket wheel I, over which passes a sprocket chain I', also passing over a sprocket wheel I², held on a spindle J connecting the rear part of the main frame A, with the auxiliary frame F. The sprocket wheel I² is connected with the large sprocket wheel K, so that when the sprocket wheel I² rotates, a like motion is given to the large sprocket wheel K. Over the latter passes a propelling chain L, extending downward and passing under sprocket wheels N and N', journaled on the lower ends of the auxiliary frame F, the said wheels being located in alignment one with the other so that that part of the chain L, extending between the said sprocket wheels N and N', is arranged horizontally alongside the runner G. The propelling chain L, is provided with spikes or blades L' adapted to pass into the snow or ice, so as to propel the vehicle forward.

In order to regulate the depth the runners E and G pass into the snow and ice, and likewise to regulate the depth the spikes or blades L' are to enter the snow or ice, the following devices are provided: The front runner E is hung on two sets of links D' and D², held in the auxiliary frame D, and the front link D' is provided with an arm D³, pivotally connected with a rod D⁴ extending upward, and guided in suitable bearings on the main frame A. The upper end of this rod D⁴, is pivotally connected with a lever D⁵ fulcrumed on the main frame and provided with a hand lever D⁶, adapted to engage a notched segment D⁷ supported on the frame A. Now, by the operator manipulating the hand lever D⁶ and the lever D⁵, the latter can be swung up or down so as to impart a like swinging motion, by the rod D⁴ and arm D³, to the link D', to cause the auxiliary frame D, to move downward or upward according to the direction in which the handle D⁵ is moved. By this means the runner E can be raised or lowered in the forked bottom of the frame D. It is understood that as the sets of links D' and D² are parallel to each other, they will move in unison when a swinging motion is given to the link D', as above described. When the operator swings the lever D⁵ downward, into its lowermost position, then the runner E is completely drawn into the horizontal bottom part of the auxiliary frame D, so as to form of the said bottom part and runner a very wide runner corresponding to the thickness of the bottom part of the auxiliary frame. The rear runner G is similarly arranged, and is hung on sets of links F' and F² and is adapted to fold into the forked bottom part of the auxiliary frame F. See Fig. 2. The forward link F' is provided with an arm F³, pivotally connected by a rod F⁴ with a lever F⁵ fulcrumed on the frame A, and provided with a hand lever F⁶, adapted to lock the lever F⁵ on a notched segment F⁷ similar to the lever D⁵ on the segment D⁷. Now, as the sprocket wheels N and N' are journaled in the auxiliary frame F, the runner G can be moved outward or inward at the bottom part of the said auxiliary frame, and the spikes or blades L' of the propelling chain L, can be moved deeper into or farther out of the snow and ice, according to whether the snow and ice is hard or soft.

In order to take up slack in the chain L, I mount the bearings for the shafts N² of the wheels N and N', in horizontal slots in the auxiliary frame F, as is plainly shown in Fig. 4, the said bearings being held longitudinally adjustable by set screws N³, so that by adjusting the latter the wheel can be moved forward or backward to take up slack or to slacken the chain if necessary.

The operation is as follows: The rider seated on the seat B, operates the pedals H' and H², so as to impart a rotary motion to the shaft H, the motion of which is transmitted by the sprocket wheels I and I² and sprocket chain I', to the sprocket wheel K, so that a traveling motion is given to the propelling chain L. The spikes or blades L' of this propelling chain L pass into the snow or ice, when reaching their lowermost position between the wheels N and N', so that a forward propelling motion is given to the machine. As the auxiliary frames D and F are connected to the main frame A by means of horizontal pivots, the runners are capable of swinging in vertical planes and thus assuming an inclination relatively to each other when passing over uneven ground, so that the runners are always parallel to the portion of the ground on which they are traveling. The operator by manipulating the lever F⁶ can cause the spikes or blades L' to pass deeper into the snow or ice to get a better hold whenever it is necessary.

By the operator manipulating the handle bar C, he can conveniently turn the front auxiliary frame D and runner E, to cause the machine to turn to one side.

It will be seen that by the arrangement described, a high rate of speed can be given to

Having thus fully described my invention, I claim as new and desire to secure by Letters Patent—

1. A snow and ice velocipede, comprising a frame separate front and rear runners supporting the same, and connected thereto by means of horizontal pivots a propeller chain mounted to travel along the rear runner and a sprocket wheel mounted on the pivot connecting the said runner with the frame, said sprocket wheel being engaged by the propeller chain, and driven from the pedal or crank shaft, substantially as shown and described.

2. A snow and ice velocipede, provided with auxiliary frames, and single runners held adjustable in the said auxiliary frames, substantially as shown and described.

3. A snow and ice velocipede, comprising auxiliary frames having forked bottom parts, a main frame supported on the said auxiliary frames, runners fitted in the forked bottom parts of the said auxiliary frames, links held on the said auxiliary frames, and connected with the said runners, and means, substantially as described, for adjusting the said links to move the runners in or out of the forked bottom parts of the said auxiliary frames, substantially as shown and described.

4. A snow and ice velocipede, comprising a main frame, auxiliary frames jointed on said main frame, runners held adjustable in the said auxiliary frames, a propelling chain adapted to be driven from the pedal or crank shaft and provided with spikes or blades, and sprocket wheels held in the rear auxiliary frame and under which passes the said propelling chain, to cause the latter to extend horizontally alongside the rear runner between the said sprocket wheels, substantially as shown and described.

5. A snow and ice velocipede, comprising a main frame, auxiliary frames jointed on said main frame, runners held adjustable in the said auxiliary frames, a propelling chain adapted to be driven from the pedal or crank shaft and provided with spikes or blades, sprocket wheels held in the rear auxiliary frame and under which passes the said propelling chain, to cause the latter to extend horizontally alongside the rear runner between the said sprocket wheels, and means, substantially as described, for operating the said propelling chain from the pedal shaft, as set forth.

DAN GREGORY BOLTON.

Witnesses:
    FRANK H. WOLCOTT,